United States Patent
Ozawa et al.

(10) Patent No.: US 7,054,140 B2
(45) Date of Patent: *May 30, 2006

(54) ELECTROLYTIC CAPACITOR AND ELECTRODE FOIL USED FOR ELECTROLYTIC CAPACITOR

(75) Inventors: Masashi Ozawa, Ome (JP); Tatsunori Tsuji, Ome (JP); Akio Ishii, Ome (JP); Kazuhiro Saegusa, Ome (JP); Kazuhiro Higuchi, Nagai (JP); Akihiro Inoue, Nagai (JP)

(73) Assignee: Nippon Chemi-Con Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/479,650

(22) PCT Filed: May 30, 2002

(86) PCT No.: PCT/JP02/05306

§ 371 (c)(1),
(2), (4) Date: Dec. 1, 2003

(87) PCT Pub. No.: WO02/097834

PCT Pub. Date: Dec. 5, 2002

(65) Prior Publication Data

US 2004/0212950 A1    Oct. 28, 2004

(30) Foreign Application Priority Data

May 31, 2001 (JP) .............................. 2001-165939
Aug. 10, 2001 (JP) .............................. 2001-244531

(51) Int. Cl.
*H01G 9/00* (2006.01)

(52) U.S. Cl. ..................... 361/523; 361/524; 361/525; 361/528; 361/530; 361/502; 29/25.03

(58) Field of Classification Search ............... 361/523, 361/524, 525, 528, 529, 530, 516, 519, 502, 361/532, 508, 509, 503, 504; 29/25.03
See application file for complete search history.

(56) References Cited

U.S. PATENT DOCUMENTS

| | | | |
|---|---|---|---|
| 3,330,999 A | | 7/1967 | Hellicar |
| 6,033,471 A | * | 3/2000 | Nakanishi et al. .......... 117/108 |
| 6,426,861 B1 | * | 7/2002 | Munshi ...................... 361/312 |
| 6,493,211 B1 | * | 12/2002 | Sugiyama et al. .......... 361/504 |
| 2004/0156150 A1 | * | 8/2004 | Higuchi et al. ............... 361/15 |

FOREIGN PATENT DOCUMENTS

| | | |
|---|---|---|
| GB | 941035 | 11/1963 |
| GB | 1071217 | 9/1964 |
| JP | 55-27457 B1 | 7/1980 |
| JP | 9-148200 A | 6/1997 |
| JP | 11-026320 | 1/1999 |
| JP | 11-26320 A | 1/1999 |
| JP | 2000-228332 A | 8/2000 |
| JP | 2002-100538 * | 5/2002 |
| TW | 771-05367 | 9/1989 |

* cited by examiner

*Primary Examiner*—Ha T. Nguyen
(74) *Attorney, Agent, or Firm*—Richard A. Dunning, Jr.

(57) ABSTRACT

There are provided a solid electrolytic capacitor having a low ESR characteristic and an electrode foil to be used for this electrolytic capacitor. In accordance with the present invention, a capacitor element uses an anode foil with a post-etching void factor of not more than 51% or a cathode foil with another post-etching void factor of not more than 44%, wherein the capacitor element contains a solvent consisting mainly of a water and a water-soluble metal complex being bonded with phosphoric acid ions, whereby the electrode foil increases in conductivity and decreases in resistivity, while an electrolytic solution thereof has a low resistivity, to thereby obtain the solid electrolytic capacitor having the low ESR characteristic and the electrode foil to be used therefor.

50 Claims, No Drawings

ELECTROLYTIC CAPACITOR AND ELECTRODE FOIL USED FOR ELECTROLYTIC CAPACITOR

TECHNICAL FIELD

The present invention relates to an electrolytic capacitor and an electrode foil used for an electrolytic capacitor.

BACKGROUND ART

An aluminum electrolytic capacitor generally has the following configuration. Namely, a stripe-shaped high-purity aluminum foil is subjected to a chemical or electrochemical etching process for increasing a surface-area thereof. The surface-area-increased aluminum foil is then subjected to a conversion treatment in a conversion solution such as an ammonium borate solution, so as to form an oxide film on a surface of the aluminum foil, thereby forming an anode foil. A cathode foil is similarly formed of a surface-area-increased high-purity aluminum foil. The anode foil and the cathode foil are laminated through a separator. This lamination structure is further rolled to form a capacitor element. This capacitor element is further impregnated with an electrolytic solution and then contained in a cylinder-shaped bottom-closed metal outer case. Further, a scaling member made of elastic rubber is also contained from the opening edge of the outer case. Furthermore, the opening edge of the outer case is sealed by a closing process to form an aluminum electrolytic capacitor.

As electrolytic solutions to be impregnated into the capacitor element of a small and low-pressure aluminum electrolytic capacitor, there have been conventionally known the electrolytic solution comprising a main solvent of ethylene glycol and a solute of an ammonium salt such as an adipic acid and a benzoic acid, and other electrolytic solutions comprising another main solvent of γ-butyrolactone and another solute of a quaternary cyclic amidinium salt such as a phthalic acid and a maleic acid.

By the way, electronic information devices have been digitalized in recent years, and the increase in driving frequency of microprocessor units (MPU) as a core part of these electronic information devices has been in progress, resulting in an increase in electric power consumption, and raising a remarkable problem of reliability caused by heat generation. As a countermeasure against this, attempts to reduce the driving voltage have been made. As a circuit for supplying a highly accurate electric power to the microprocessor, a DC-DC converter so called as a voltage regulator module (VRM) has widely been used. For an output-side capacitor, a large number of capacitors with a low equivalent series resistance (ESR) are used for preventing any voltage drop. As a capacitor having this low ESR characteristic, a solid electrolytic capacitor using a solid electrolyte has been practiced in use and widely used as a capacitor suitable for these purposes.

The increase in driving frequency of the microprocessor has been remarkable, however, with increasing the power consumption. In order to respond to that, the increase of the power supplied from the capacitor has been requested for preventing any voltage drop. In other words, a large power supply must be made in a short time, for which purpose the above-mentioned solid electrolytic capacitor is needed to not only be increased in capacity and decreased in size and voltage but also have the ESR characteristic lower than ever.

Attempts have been made to further reduce the resistivity of the electrolytic solution by including a large amount of water in the electrolytic solution. Despite the low resistivity of the electrolyte, however, such electrolytic capacitor has other problems with an insufficient effect of reducing the ESR thereof, and a non-good aging property.

As described above, there is a limitation to the reduction of the ESR of the capacitor by improving the electrolytic solution to be used for electrolytic capacitor, and a further reduction of the ESR remains as a difficult problem.

The present invention was made to solve the above-described problem and provides an electrolytic capacitor with a realized low-ESR and an electrode foil to be used for electrolytic capacitor

DISCLOSURE OF THE INVENTION

In accordance with the electrolytic capacitor of the present invention, a capacitor element is provided with an anode foil of an etched foil of the void factor of not more than 51% contains a bonded material formed by bonding a water-soluble metal complex to phosphoric acid ions and a solvent consisting mainly of water Namely, the etched foil of the void factor of not more than 51% is subjected to a conversion treatment or an anodic oxidation to obtain the anode foil of the present invention. By setting the void factor of the etched foil at 51% or less, the anode foil increases in conductivity and decreases in resistivity, to thereby achieve, in combination with the electrolytic solution using the solvent consisting mainly of water, an electrolytic capacitor having an unprecedentedly low ESR characteristic. If the void factor exceeds 51%, then the anode foil increases in resistivity, and a desirable ESR characteristic is no longer obtainable. Further, if the void factor is 20% or more, a high capacity is obtained and thus this is preferable. The void factor of the etched foil in this case is defined to be a value calculated by dividing the volume of voids the etched foil by the apparent volume of the etched foil.

Usually, if a solvent consisting mainly of water is used for an electrolytic solution, then a problem is raised with a remarkable deterioration in hydration of the electrode foil, which causes further problems with a deterioration in the aging property and a valve opening. According to the present invention, however, the capacitor element contains a bonded material formed by bonding a water-soluble metal complex to phosphoric acid ions, for which reason this bonded material causes phosphoric acid ions discharged into the electrolytic solution, so that a proper amount of the phosphoric acid ions is kept in the electrolytic solution, and the deterioration of the electrode foil through hydration is prevented. Accordingly, the aging property is good.

Furthermore, if the foil thickness of the anode foil of the above-described electrolytic capacitor is not less than 70 μm, then the anode foil decreases in resistivity to reduce the ESR, while if the foil thickness of the anode foil is not more than 150 μm, downsizing of the capacitor is allowable. Thus, it is preferable that the foil thickness is 70~150 μm.

Further, in accordance with the electrolytic capacitor of the present invention, the capacitor element provided with the cathode foil using an etched foil of the void factor of not more than 44% contains a bonded material formed by bonding a water-soluble metal complex to phosphoric acid ions and a solvent consisting mainly of water. By setting the void factor of the etched foil at 44% or less, the cathode foil increases in conductivity while the anode foil decreases in resistivity, to thereby achieve, with an assist of the electrolytic solution using the solvent consisting mainly of water, an electrolytic capacitor having an unprecedentedly low ESR characteristic. If the void factor exceeds 44%, then the cathode foil increases in resistivity, whereby any desirable ESR characteristic is not obtainable. Further, if the void factor is 10% or more, then a high capacity is obtained, and thus this is preferable.

Still further, if the foil thickness of the cathode foil of the above-described solid electrolytic capacitor is in the rage of 50–100 μm, the ESR further decreases and the downsizing of the capacitor is allowable. Thus this is preferable.

Furthermore, in the above-described solid electrolytic capacitor formed by rolling the electrode foils, the electrode foils of the capacitor are long and the resistivity of the electrode foils themselves is essentially large, for which reason the ESR-reducing effect of the capacitor is extremely large.

If the metal complex is an aluminum complex, it is possible to form a bonded material including a water-soluble metal complex and phosphoric acid ions within the capacitor element of the aluminum electrolytic capacitor.

Moreover, if the content of water in the solvent is 35~100 wt %, the ESR of the electrolytic capacitor decreases, and thus this is preferable.

THE BEST MODE FOR CARRYING OUT THE INVENTION

Embodiments of the present invention will be described specifically. An aluminum foil is subjected to an AC-etching in an etching solution such as a hydrochloric acid solution for causing a surface thereof to be rough, and the void factor is set at not more than 51%. Further, in order to form a dielectric film, the aluminum foil is subjected to a conversion treatment in a conversion solution such as a phosphoric acid solution to form an anode foil. By setting the void factor of the etched foil at not more than 51%, preferably not more than 43%, and more preferably not more than 37%, then the anode foil increases in conductivity and decreases in resistivity, resulting is a reduction in the ESR of the electrolytic capacitor. As described above, the present invention reduces the void factor for increasing the conductivity of the electrode foils so as to reduce the ESR, and thus the effect of the present invention will not decrease, independently from the conditions for the depth and the area ratio of the etching pits, for example, even under the condition that the etching pits are different in depth between the both sides of the etched foil. Furthermore, in order to ensure the maximum capacity per a unit volume, it is preferable that the void factor is not less than 20% to increase the etching area and obtain the high capacity.

Moreover, if the thickness of the anode foil is not less than 70 μm, and more preferably not less than 90 μm, then the anode foil decreases in resistivity to reduce the ESR. If the thickness of the anode foil is not more than 150 μm, then the capacity per a unit volume of the capacitor is improved, thereby allowing the downsizing of the capacitor. Therefore, it is preferable that the foil thickness is 70~150 μm, more specifically 90~150 μm.

Further, similarly to the anode foil, another aluminum foil is subjected to the AC etching or the chemical etching for causing a surface thereof to be rough, so that the void factor is not more than 44%, preferably not more than 35%, and more preferably not more than 26%, to thereby form a cathode foil. The cathode foil thus decreases in resistivity to reduce the ESR of the electrolytic capacitor. Still further, in order to ensure the maximum capacity per a unit volume, it is preferable that the void factor is not less than 10% to increase the etching area and obtain the high capacity. Moreover, if the thickness of the cathode foil is 50~100 μm, more specifically 70~100 μm, then the ESR further preferably decreases, thereby allowing the downsizing of the capacitor.

In accordance with an electrolytic capacitor using an electrolytic solution of a low resistivity including a solvent consisting mainly of water for decreasing the void factor and increasing the conductive part of the electrode foil, optimizations may be made of a resistance per a unit area of the electrode foil, for example, a resistance defined between opposite sides of the squire-shaped electrode foil (hereinafter referred to as a resistivity of the foil) as well as of the width and the area of the foil, thereby obtaining a further redaction in the ESR of the capacitor.

The resistivity of the electrode foil used for the present invention is 0.4~0.79 mΩ, more preferably 0.5~0.61 mΩ. This range of the electrode foil as used causes the electrode foils to be decreased in resistivity, thereby to reduce the ESR. The lower resistivity than that range causes an insufficient effect of reduction to the ESR. The higher resistivity than that range lowers the ESR-redaction effect.

Further, the foil width is 8~25 mm, preferably 12~25 mm. The narrower width than this range allows that a reduction of the foil resistivity causes domination of the resistance of the electrolyte, thereby obtaining no reduction in the ESR. The wider width than this range decreases the ESR-reduction effect. This is unsuitable for a small size product.

It is necessary that the foil area is not smaller than 1500 mm$^2$, preferably not smaller than 2500 mm$^2$, and more preferably not smaller than 5000 mm$^2$. The smaller area of the foil than this range means that the contact area between the electrode foils and the electrolyte is small for making it difficult to reduce the ESR. Further, the electrolytic capacitor according to the present invention uses the capacitor element comprises a roll of laminations of the electrode foils sandwiching the separator. This allows the use of the electrode foils having a long length for obtaining a sufficient area of the foils and decreasing the ESR.

In order that the resistivity of the electrode foil is 0.4~0.79 mΩ, more preferably 0.5~0.61 mΩ as described above, it is possible to use the electrode foil having a core thickness of 35~65 μm, more specifically 45~55 μm.

As described above, the cathode foil comprises the etched foil, and the anode foil comprises the etched foil coated with an oxide coating film which was formed by applying a current to this etched foil in a conversion solution comprising a phosphoric acid solution. Therefore, the cathode comprises an non-etched aluminum part (hereinafter referred to as a core), and the etched part. The anode foil comprises the non-etched part and the etched part as well as the oxide coating film. The thickness of the core may be 35~65 μm, more preferably 45~55 μm, so that the foil resistivity may be 0.4~0.79 mΩ, more preferably 0.5~0.61 mΩ.

It is also preferable that a conversion film is formed at 0.1V~10V, preferably 0.3~5V on the cathode foil for reducing the ESR and improving a life-time at high temperature.

Also, it is preferable that a layer of anti-oxidizable metal compound or metal such as titanium nitride or titanium is formed on the surface of the cathode electrode for increasing an electrostatic capacity. It is further preferable that the conversion film is formed on the cathode electrode and the above-described layer of the anti-oxidizable metal or metal compound is further formed on this conversion film.

The above-described anode foil and cathode foil are connected respectively with electrode plugs and the electrode foils laminated through a separator are rolled. It is possible to obtain the effect of the present invention by using the above-described anode foil of the present invention and a conventional cathode foil or a conventional anode foil and the above-described cathode foil of the present invention. The maximum effect can be obtained by using both of the anode foil and the cathode foil of the present invention.

Usable as a separator in this case are Manila paper, kraft paper, glass separator, nonwoven fabric made of synthetic fiber such as vinylon and polyester, and porous separator.

When an electrode plug is connected with an electrode foil, if used is the electrode foil of the present invention with an increased conductivity, the contact resistance of the jointing of the electrode foil and the electrode plug decreases to further reduce the ESR of the electrolytic capacitor.

Then, the capacitor element thus formed is impregnated with the electrolytic solution of the present invention using a solvent consisting mainly of water and contained in a cylinder-shaped bottom-closed metal case, so that the opening edge is covered with a sealing rubber for sealing by a caulking process.

The water content of the solvent is 35~100 wt %. If it is not more than 75 wt %, the low-temperature characteristic is good, and thus more preferable is 35~75 wt %.

Hereupon, a bonded material formed by bonding a water-soluble metal complex to phosphoric acid ions is included in the capacitor element. This water-soluble bonded material can be obtained by dissolving in a solvent a compound producing metal ions in a solution coupled with a chelating agent (hereinafter, a metal-producing compound) and a compound producing phosphoric acid ions (hereinafter, a phosphoric acid-producing compound). Namely, in this solution, the metal formed in a solution by the chelating agent and the metal-producing compound is chelated to form a water-soluble metal complex. Then, this water-soluble metal complex reacts with the phosphoric acid ion produced in a solution by the phosphoric acid-producing compound, to thereby form a bonded material formed by bonding a water-soluble metal complex to phosphoric acid ions (hereinafter, a water-soluble bonded material). The solvent used here only needs to dissolve the chelating agent, the metal-producing compound, and the phosphoric acid-producing compound. Above all, such materials as water, ethylene glycol and γ-butyrolactone are preferable. The water-soluble bonded material thus formed is then added to the electrolytic solution to be included into the capacitor element. Also, this water-soluble bonded material may be adhered to the electrode foils or the separator by an application thereof, so that the water-soluble bonded material is included in the capacitor element.

Further, by impregnating the capacitor element with an electrolytic solution to which the chelating agent, the metal-producing compound and the phosphoric acid-producing compound are added, the water-soluble bonded material may be included in the capacitor element. In this electrolytic solution, a water-soluble bonded material is formed by the reaction similar to the above-described reaction in the solvent, and by impregnating the capacitor element with this electrolytic solution, the water-soluble bonded material may be included in the capacitor element. Furthermore, in case of an electrode foil comprising aluminum, aluminum ions are dissolved from the electrode foil, for which reason it is possible to form a bonded material formed by bonding a water-soluble aluminum complex to phosphoric acid ions without the need of adding a metal-producing compound, and thus it is preferable.

The water-soluble bonded material thus included gradually discharge phosphoric acid ions into the electrolytic solution, so that the phosphoric acid ions in the electrolytic solution are kept at a proper amount for a long time. Then, by the phosphoric acid ions kept at the proper amount, the aging property is kept favorably.

As chelating agents, there are available: α-hydroxycarboxylic acids such as a citric acid, a tartaric acid, a gluconic acid, a malic acid, a lactic acid, a glycolic acid, an α-hydroxybutyric acid, a hydroxymalonic acid, an α-methylmalic acid and a dihydroxytartaric acid; aromatic hydroxycarboxylic acids such as a γ-resorcylic acid, β-resorcylic acid, a trihydroxybenzoic acid, a hydroxyphthalic acid, a dihydroxyphthalic acid, a phenol tricarboxylic acid, an aurintricarboxylic acid and an erio chrome cyanine R; a sulfocarboxylic acids such as a sulfosalicylic acid; guanidines such as dicyandiamide; sugars such as galactose and glucose; lignins such as lignosulfonate, and amino-polycarboxylic acids such as an ethylene diamine tetraacetic acid (EDTA), a nitrilotriacetic acid (NTA), a glycol ether diamine tetraacetic acid (GEDTA), a diethylenetriamine pentaacetic acid (DTPA), a hydroxyethyl ethylene diamine triacetic acid (HEDTA) and a triethylene tetramine hexaacetic acid (TTHA) or these salts. As such salts, an ammonium salt, an aluminum salt, a sodium salt and a potassium salt can be used.

As metal-producing compounds, there are metals and metal compounds. As metals, those metals which form a complex coupled with a chelating agent such as aluminum, iron, copper, nickel, manganese, zinc, calcium, magnesium, barium, lead, titanium, niobium and tantalum can be used. Further, as metal-producing compounds, those compounds which produce metal ions in a solution such as oxide, hydroxide, chloride and metal salts including sulfate and carbonate can be used. Above all, aluminum is preferable.

As phosphoric acid-producing compounds, there are the phosphorus compounds represented by a general formula (Chem. 1) or the salts thereof, the condensate thereof, the salts of these condensate.

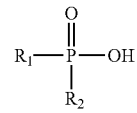
(Chem. 1)

(In the formula, $R_1$ and $R_2$ are —H, —OH, —$R_3$ and —$OR_3$: $R_3$ and $R_4$ are alkyl group, allyl group, phenyl group and ether group.)

As these phosphoric acid-producing compounds, there are the followings: orthophosphoric acid, phosphorous acid and hypophosphorous acid, and the salts thereof. The salts thereof are ammonium salt, aluminum salt, sodium salt, calcium salt and potassium salt. Orthophosphoric acid and the salt thereof dissolve in a solution to generate phosphoric acid ions. Further, phosphorous acid, hypophosphorous acid and the salts thereof are decomposed in a solution to generate phosphorous acid ions and hypophosphorous acid ions and then oxidized to become phosphoric acid ions.

There are further phosphoric acid compounds such as ethyl phosphate, diethyl phosphate, butyl phosphate and dibutyl phosphate, and phosphonic acid compounds such as 1-hydroxy ethylidene-1,1-diphosphonic acid, aminotrimethylene phosphonic acid and phenyl phosphonic acid. To add more, there are phosphinic acid compounds such as methyl phosphinic acid and phosphinic acid butyl.

Further, there are condensed phosphoric acids and the salts thereof, as follows: linear condensed phosphoric acids such as pyrophoric acid, tripolyphosphoric acid and tetrapolyphosphoric acid, cyclic condensed phosphoric acids such as metaphosphoric acid and hexametaphosphoric acid, and bonded materials of these linear and cyclic condensed phosphoric acids. As salts of these condensed phosphoric acids, ammonium salt, aluminum salt, sodium salt, calcium salt and potassium salt can be used.

They are also phosphoric acid-producing compounds which generate phosphoric acid ions in a solution or which generate phosphorous acid ions and hypophosphorous acid ions and then are oxidized to become phosphoric acid ions. Preferable among these are orthophosphoric acid which easily generates phosphoric acid ions, the salt thereof, condensed phosphoric acid and phosphoric acid compound. Also preferable are orthophosphoric acids which exhibit relatively quick generations of a large number of phosphoric acid ions for the amount of addition, for example, linear condensed phosphoric acids such as pyrophoric acid and tripolyphosphoric acid, and the salts thereof. Even with materials other than these compounds, the effect of the present invention can be obtained, if the materials generate phosphoric acid ions in a solution.

Furthermore, as solutes included in the electrolytic solution, there are ammonium salt, amine salt, quaternary ammonium salt and quaternary salt of a cyclic amidine compound, which are usually used for the electrolytic solution for electrolytic capacitor, wherein the acid-conjugate base of theses is of anion component. As amines comprising the amine salt, there are primary amines (such as methylamine, ethylamine, propylamine, butylamine and ethylene diamine), secondary amines (such as dimethylamine, diethylamine, dipropylamine, methyl ethylamine and diphenylamine) and tertiary amine (such as trimethylamine, triethylamine, tripropylamine, triphenylamine and 1,8-diazabicyclo(5,4,0)-undecene-7). As quaternary ammoniums comprising quaternary ammonium salt, there are tetra-alkyl ammoniums (such as tetra methyl ammonium, tetra ethyl ammonium, tetra propyl ammonium, tetra butyl ammonium, methyl triethyl ammonium and dimethylethyl ammonium) and pyridiums (such as 1-methyl pyridium, 1-ethyl pyridium and 1,3-diethyl pyridium). Further, as cations comprising quaternary salt of a cyclic amidine compound, there are cations formed by quaternarizing the following compounds: namely, imidazole monocyclic compounds (imidazole congeners such as 1-methylimidazole, 1,2-dimethylimidazole, 1,4-dimethyl-2-ethylimidazole and 1-phenylimidazole, oxyalkyl derivatives such as 1-methyl-2-oxymethyl imidazole and 1-methyl-2-oxyethyl imidazole, nitro derivatives and amino derivatives such as 1-methyl-4(5)-nitroimidazole and 1,2-dimethyl-5(4)-aminoimidazole), benzoimidazoles (such as 1-methyl benzoimidazole and 1-methyl-2-benzyl benzoimidazole), compounds having a 2-imidazolin ring (such as 1-methylimidazolin, 1,2-dimethylimidazolin, 1,2,4-trimethylimidazolin, 1,4-dimethyl-2-ethylimidazolin and 1-methyl-2-phenylimidazolin), compounds having a tetrahydropyrimidine ring (such as 1-methyl-1,4,5,6-tetrahydropyrimidine, 1,2-dimethyl-1,4,5,6-tetrahydropyrimidine, 1,8-diazabicyclo[5,4,0]undecene-7 and 1,5-diazabicyclo[4,3,0]nonen-5).

As anion components, there are such organic acids as decandicarboxylic acids including adipic acid, glutaric acid, succinic acid, benzoic acid, isophthalic acid, phthalic acid, terephthalic acid, maleic acid, toluic acid, enanthic acid, malonic acid, formic acid, 1,6-decandicarboxylic acid and 5,6-decandicarboxylic acid, octane-dicarboxylic acids including 1,7-octane-dicarboxylic acid, azelaic acids and sebacic acids, or conjugate bases of inorganic acids such as boric acid, multiple alcohol complex compound obtained from boric acid and multiple alcohol, phosphoric acid, carbonic acid and silic acid. Preferable among these are organic carboxylic acids such as decandicarboxylic acid, octane-dicarboxylic acid, azelaic acid, sebacic acid, adipic acid, glutaric acid, succinic acid, benzoic acid, isophthalic acid and formic acid, or boric acid and multiple alcohol complex compound of boric acid.

If adipic acid or at least a kind of the salt thereof is used as a solute, the ESR further decreases. The content of the adipic acid or at least a kind of the salt thereof in the electrolytic solution is 5~23 wt %, preferably 8~18 wt %. With the content above this range, the resistivity decreases, while with the content below this range, the low-temperature characteristic is good. The content of the other solutes described above in the total electrolytic solution is also approximately 5~23 wt %, preferably 8~18 wt %.

In order to further reduce the ESR, it is preferable to use formic acid or the salt thereof as a solute. The content of these in the electrolytic solution is 3~15 wt %, preferably 6~12 wt %. With the content below this range, the ESR-reducing effect is small, while with the content above this range, expansion and opening of a valve are caused by generation of gas. Further, if an organic acid of 3~15 wt % or the salt thereof is added, the ESR decreases. As this organic acid, there are such organic acids as the above-described adipic acid and glutaric acid. Preferable among these is adipic acid.

As the electrolytic solution of the present invention, a solvent consisting mainly of water is used, and as a secondary solvent, protic polar solvent, aprotic polar solvent, water and mixture of these may be used. As protic polar solvents, there are monohydric alcohols (such as methanol, ethanol, propanol, butanol, hexanol, cyclohexanol, cyclopentanol and benzyl alcohol) and multiple alcohols and oxyalcohol compounds (multiple alcohol compounds and oxyalcohol compounds) (such as ethylene glycol, propylene glycol, glycerin, methyl cellosolve, ethyl cellosolve, 1,3-butanediol and methoxypropylene glycol). As aprotic polar solvents, there are, as typical examples, amides (such as N-methylformamide, N,N-dimethylformamide, N-ethylformamide, N,N-dimethylformamide, N-methylacetamide and hexamethylphosphoric amide), lactones (such as γ-butyrolactone and δ-valerolactone), cyclic amides (such as N-methyl-2-pyrrolidone), carbonates (such as ethylene carbonate and propylene carbonate), nitriles (such as acetonitrile), oxides (such as dimethyl sulfoxide), 2-imidazolidinone systems [1,3-dialkyl-2-imidazolidinone (such as 1,3-dimethyl-2-imidazolidinone, 1,3-diethyl-2-imidazolidinone and 1,3-di(n-propyl)-2-imidazolidinone) and 1,3,4-trialkyl-2-imidazolidinone (such as 1,3,4-trimethyl-2-imidazolidinone)].

Further, for the purpose of stabilizing the operating-life characteristic of the electrolytic capacitor, it is possible to add aromatic nitro compounds such as nitrophenol, nitro benzoic acid, nitro acetophenone, nitro benzyl alcohol, 2-(nitrophenoxy) ethanol, nitroanisole, nitrophenetol, nitro toluene and dinitrobenzene.

Furthermore, for the purpose of improving the safety of the electrolytic capacitor, it is also possible to add a nonionic surface-active agent cable of improving the withstand voltage of the electrolytic solution, polyoxyalkylene multiple alcohol ethers obtained from the addition condensation of multiple alcohol to ethylene oxide and/or propylene oxide, and polyvinyl alcohol.

Moreover, it is possible to further improve the withstand voltage by adding such materials as boric acid, complex carbohydrate (such as mannit, sorbit and pentaerythritol), a complex compound of boric acid with complex carbohydrate, and colloidal silica, to the electrolytic solution to be used for the electrolytic capacitor of the present invention.

For the purpose of reducing leakage current, it is further possible to add such materials as oxycarboxylic acid compound.

The electrolytic capacitor thus formed in accordance with the present invention has a low ESR characteristic and a good aging property.

Specific examples of the electrolytic capacitor of the present invention will be then described below.

EXAMPLE 1

An aluminum foil is subjected to an alternate etching for surface roughening and then to a conversion for forming a dielectric oxide film, to thereby form the anode foil of the present invention. Further, another aluminum foil is similarly subjected to an alternate etching for surface roughening, so that a conversion film is formed on the surface thereof to form a cathode foil. The anode foil and the cathode foil are then rolled, with the foils laminated through a separator, to thereby form a capacitor element.

The capacitor element formed as described above is impregnated with the electrolytic solution for driving of an aluminum electrolytic capacitor electrolytic solution. The capacitor element impregnated with this electrolytic solution is then contained in a cylinder-shaped bottom-closed aluminum outer case, and a sealing member made of butyl rubber is inserted in the opening edge of the outer case. Then, the opening edge of the outer case is subjected to a closing process for sealing the aluminum electrolytic capacitor. By so doing, an electrolytic capacitor of $10\phi \times 20$ L is formed.

The electrolytic solution used here was produced as follows. First, 10 parts of water is added with 1% of diethylenetriamine pentaacetic acid, 0.2% of aluminum hydroxide and 1.5% of ammonium dihydrogen phosphate for completing a chelating reaction and a phosphoric acid ion bonding reaction, so as to form a water-soluble bonded material. Subsequently, a solution of this water-soluble bonded material is added to an electrolytic solution comprising 50% of water, 18% of ethylene glycol, 10% of ammonium adipate and 8% of ammonium formate, so as to form the electrolytic solution of the present invention.

EXAMPLE 1-1

For an electrolytic capacitor formed as described above, a foil having a thickness of 100 μm and a post-etching void factor of 26% was used as an anode foil and a foil having a thickness of 85 μm and a post-etching void factor of 19% was used as a cathode foil, so as to use the electrolytic capacitor as the example 1-1.

EXAMPLE 1-2

For another electrolytic capacitor formed as described above, a foil having a thickness of 100 μm and a post-etching void factor of 46% was used as an anode foil and a foil having a thickness of 50 μm and a post-etching void factor of 39% was used as a cathode foil, so as to use the electrolytic capacitor as the example 1-2.

EXAMPLE 1-3

Still another electrolytic capacitor was formed by the same measure used for the example 1-2, except that a foil having a thickness of 100 μm and a post-etching void factor of 33% was used as an anode foil, so as to use the electrolytic capacitor as the example 1-3.

EXAMPLE 1-4

For yet another electrolytic capacitor formed as described above, a foil having a thickness of 100 μm and a post-etching void factor of 52% was used as an anode foil and a foil having a thickness of 75 μm and a post-etching void factor of 22% was used as a cathode foil, so as to use the electrolytic capacitor as the example 1-4.

Comparative Example 1

Further, for another electrolytic capacitor formed as described above, a foil having a thickness of 100 μm and a post-etching void factor of 52% was used as an anode foil and a foil having a thickness of 50 μm and a post-etching void factor of 39% was used as a cathode foil, so as to use the electrolytic capacitor as the comparative example 1.

EXAMPLE 2

Similarly to the example 1, an electrolytic capacitor of $10\phi \times 12.5$ L was formed. Then, the electrolytic capacitors having the same electrode foils as those of the examples 1-1 and 1-3 were used for the examples 2-1 and 2-2 respectively, and the electrolytic capacitor having the same electrode foils as those of the comparative example 1 was used for the comparative example 2.

(Table 1) represents the comparisons between the foil resistances of the anode foils and the ESRs of the electrolytic capacitors of the examples 1-1~1-4, 2-1 and 2-2, and the comparative examples 1 and 2.

TABLE 1

| | Anode foil | | | Cathode foil | | |
|---|---|---|---|---|---|---|
| | Void factor (%) | Foil thickness (μm) | Foil resistance (mΩ/m) | Void factor (%) | Foil thickness (μm) | ESR (mΩ) |
| Example 1-1 | 26 | 100 | 34 | 19 | 85 | 8.7 |
| Example 1-2 | 46 | 100 | 68 | 39 | 50 | 10.4 |
| Example 1-3 | 33 | 100 | 40 | 39 | 50 | 9.9 |
| Example 1-4 | 52 | 100 | 103 | 22 | 75 | 9.9 |
| Example 2-1 | 26 | 100 | 70 | 19 | 85 | 16.2 |
| Example 2-2 | 33 | 100 | 84 | 39 | 50 | 19.5 |
| Comparative example 1 | 52 | 100 | 103 | 39 | 50 | 11.3 |
| Comparative example 2 | 52 | 100 | 213 | 39 | 50 | 20.8 |

As can be seen from (Table 1), according to the electrolytic capacitor of $10\phi \times 12.5$ L, the ESR is reduced in the examples 1-2 and 1-3 using the anode foil of the present invention and in the example 1-4 using the cathode foil of the present invention, compared with the comparative example 1. Further, in the example 1-1 wherein an anode foil having a void factor of 26% and a cathode foil having a void factor of 19% are used, the ESR is reduced to 8.7 mΩ, achieving an unprecedentedly low ESR. Still further, the ESR decreases more in the example 1-3 wherein an anode foil having a void factor of 33% is used than in the example 1-2 wherein an anode foil having a void factor of 46% is used.

Furthermore, as the void factor is reduced from 52% of the comparative examples to 26, 33 and 46% of the examples, the foil resistance is reduced from 103 mΩ/m to 34~68 mΩ/m in the example 1, and from 213 mΩ/m to 70~84 mΩ/m in the example 2. This reveals that an electrode foil increases in conductivity and decreases in resistivity.

As a comparative example, an electrolytic element was formed in a similar way to the example 1-1 and the electrolytic element was impregnated with a conventional electrolytic solution comprising a solute of quaternary amidinium salt, to thereby form an electrolytic capacitor. The used electrolytic solution comprises 75 parts of γ-butyrolactone and 25 parts of ethyl phthalate-dimethyl-imidazolium. The obtained ESR is a high value of 29 mΩ, which reveals that the effect of the present invention cannot be obtained even with the use of the electrode foils of the present invention, if an example consisting mainly of water is not used.

The same result was obtained also from the electrolytic capacitor of 10φ×12.5 L, which clearly shows the effect of the present invention.

Subsequently, a no-load test and a high-temperature-load test at the temperature of 105° C. for 1000 hours were carried out for each of the examples 1-1~1-4, 2-1, 2-2 and a conventional example using the electrode foils of the comparative example 1 and a conventional electrolytic solution to which the water-soluble bonded material of the present invention was not added. While good values were obtained from the examples, the valves were all opened in a few hours after the start of a test in the conventional example. It was thus found that, in accordance with the electrolytic capacitor of the present invention, the aging property is good even though the electrolytic capacitor contains a solvent consisting mainly of water.

The examples specifying the foil resistivity, the foil width and the foil area will be then described.

An aluminum foil is subjected to an alternate etching for surface roughening and then to conversion for forming a derivative oxide film, to thereby form an anode foil of the present invention. Further, another aluminum foil is similarly subjected to an alternate etching for surface roughening, so that a conversion film is formed on the surface thereof to thereby form a cathode foil. The anode foil and the cathode foil are rolled, with the foils laminated through a separator, to thereby form a capacitor element.

The capacitor element formed as described above is impregnated with the electrolytic solution for driving of an aluminum electrolytic capacitor. The capacitor element impregnated with this electrolytic solution is then contained in a cylinder-shaped bottom-closed aluminum outer case, and a sealing member made of butyl rubber is inserted in the opening edge of the outer case. Then, the opening edge of the outer case is subjected to a closing process for sealing the aluminum electrolytic capacitor.

The electrolytic solution sued here was produced as follows. First, 10% of water is added with 1% of diethylenetriamine pentaacetic acid, 0.2% of aluminum hydroxide and 1.5% of ammonium dihydrogen phosphate for completing a chelating reaction and a phosphoric acid ion bonding reaction, so that a water-soluble bonded material is formed. Subsequently, a solution of this water-soluble bonded material is added to an electrolytic solution comprising 50% of water, 18% of ethylene glycol, 10% of ammonium adipate and 8% of ammonium formate, so as to form an electrolytic solution of the present invention.

(Table 2) represents the foil resistivity, the foil width, the foil area and the left-core thickness of each of the electrode foils used here as well as the ESR of the respective examples.

TABLE 2

| | Foil resistivity (mΩ) | Foil width (mm) | Foil area (mm²) | Left-core thickness (μm) | ESR (mΩ) |
|---|---|---|---|---|---|
| Example 1 | 0.69 | 9.5 | 2400 | 40 | 12.4 |
| Example 2 | 0.68 | 13 | 1950 | 41 | 12.8 |
| Example 3 | 0.55 | 14 | 3200 | 52 | 8.9 |
| Example 4 | 0.34 | 17 | 2800 | 51 | 8.4 |
| Example 5 | 0.56 | 25 | 5700 | 50 | 5.7 |
| Comparative example 1 | 0.93 | 10 | 2700 | 31 | 13.9 |
| Comparative example 2 | 0.42 | 6 | 3900 | 65 | 18.8 |
| Comparative example 3 | 0.43 | 14 | 1200 | 65 | 17.5 |

As can be seen from (Table 2), the electrolytic capacitors of the examples 1-5 of the present invention have a low ESR value of 5.7~12.8 mΩ. Particularly, in the examples 3~4 with a foil area of not smaller than 2500 mm², the ESR value is 8.9~8.4 mΩ or not more than 10 mΩ, and the ESR value becomes further smaller in the example 5 wherein the foil area is not smaller than 5000 mm².

By contrast, in the comparative example 1 wherein the foil resistivity is 0.93 mΩ, the ESR becomes a large value of 13.9 mΩ, even though the example has the foil width of 10 mm and the foil area of 2700 mm², which are larger than the foil width and the foil area of the example 1. Further, in the comparative example 2 with the foil width of 6 mm, the ESR is as large as 18.8 mΩ, even though the foil resistivity of the example is 0.42 mΩ, which is smaller than the foil resistivitys of the examples 1~3, and also the foil area of the example is 3900 mm², which is larger than the foil areas of the examples 1~3. Still further, in the comparative example 3 with the foil area of 1200 mm², the ESR becomes a large value of 17.5 mΩ, despite a low foil resistivity of 0.43 mΩ.

Furthermore, as a comparative example 4, an capacitor element was formed in a similar way to the example 1 and then impregnated with a conventional electrolytic solution comprising a solute of quaternary amidinium salt, to thereby form an electrolytic capacitor. The used electrolytic solution comprises 75% of γ-butyrolactone and 25% of ethyl phthalate-dimethyl-imidazolium. The obtained ESR is a high value of 29.1 mΩ, which reveals that the effect of the present invention cannot be obtained even with the use of the electrode foils of the present invention, if an example consisting mainly of water is not used.

Subsequently, a no-load test and a high-temperature-load test at the temperature of 105° C. for 1000 hours were carried out for each of the electrolytic capacitors of the examples 1~3 and the electrolytic capacitors using the electrode foils of the examples 1-3 and a conventional electrolytic solution to which the water-soluble bonded material of the present invention is not added. While good values were obtained from the examples, the valves were all opened in a few hours after the start of the test in the conventional example. It was thus found that, in accordance with the electrolytic capacitor of the present invention, the aging property is good even though the electrolytic capacitor contains a solvent consisting mainly of water.

As described above, in accordance with the present invention, it is possible to provide an electrolytic capacitor having an unprecedentedly low ESR characteristic and a good aging property and an electrode foil for electrolytic capacitor to be used therefor.

The invention claimed is:

1. An electrolytic capacitor containing a solvent within a capacitor element provided with an anode foil using an etched foil of a void factor of not more than 51%, wherein said solvent consists essentially of a bonded material comprising a water-soluble metal complex bonded with phosphoric acid ions and water, wherein a left-core thickness of the etched foil is from 35 to 65 μm and a foil resistivity of the etched foil is from 0.4 to 0.79 mΩ.

2. The electrolytic capacitor as claimed in claim 1, wherein said void factor is not less than 20%.

3. The electrolytic capacitor as claimed in claim 2, wherein said capacitor element is formed by rolling a lamination structure of a separator sandwiched between said anode foil with an anode plug and said cathode foil with a cathode plug.

4. The electrolytic capacitor as claimed in claim 3, wherein said metal complex is an aluminum complex.

5. The electrolytic capacitor as claimed in claim 4, wherein a water content of said solvent is 35~100 wt %.

6. The electrolytic capacitor as claimed in claim 3, wherein a water content of said solvent is 35~100 wt %.

7. The electrolytic capacitor as claimed in claim 2, wherein said metal complex is an aluminum complex.

8. The electrolytic capacitor as claimed in claim 7, wherein a water content of said solvent is 35~100 wt %.

9. The electrolytic capacitor as claimed in claim 2, wherein a water content of said solvent is 35~100 wt %.

10. The electrolytic capacitor as claimed in claim 1, wherein a thickness of the anode foil is 70~150 μm.

11. The electrolytic capacitor as claimed in claim 10, wherein said capacitor element is formed by rolling a lamination structure of a separator sandwiched between said anode foil with an anode plug and said cathode foil with a cathode plug.

12. The electrolytic capacitor as claimed in claim 11, wherein said metal complex is an aluminum complex.

13. The electrolytic capacitor as claimed in claim 11, wherein a water content of said solvent is 35~100 wt %.

14. The electrolytic capacitor as claimed in claim 12, wherein a water content of said solvent is 35~100 wt %.

15. The electrolytic capacitor as claimed in claim 10, wherein said metal complex is an aluminum complex.

16. The electrolytic capacitor as claimed in claim 15, wherein a water content of said solvent is 35~100 wt %.

17. The electrolytic capacitor as claimed in claim 10, wherein a water content of said solvent is 35~100 wt %.

18. The electrolytic capacitor as claimed in claim 1, wherein said capacitor element is formed by rolling a lamination structure of a separator sandwiched between said anode foil with an anode plug and said cathode foil with a cathode plug.

19. The electrolytic capacitor as claimed in claim 18, wherein said metal complex is an aluminum complex.

20. The electrolytic capacitor as claimed in claim 19, wherein a water content of said solvent is 35~100 wt %.

21. The electrolytic capacitor as claimed in claim 18, wherein a water content of said solvent is 35~100 wt %.

22. The electrolytic capacitor as claimed in claim 1, wherein said metal complex is an aluminum complex.

23. The electrolytic capacitor as claimed in claim 22, wherein a water content of said solvent is 35~100 wt %.

24. The electrolytic capacitor as claimed in claim 1, wherein a water content of said solvent is 35~100 wt %.

25. An electrolytic capacitor containing a solvent within a capacitor element provided with a cathode foil using an etched foil of a void factor of not more than 44%, wherein said solvent consists essentially of a bonded material comprising a water-soluble metal complex bonded with phosphoric acid ions and water, wherein a left-core thickness of the etched foil is from 35 to 65 μm and a foil resistivity of the etched foil is from 0.4 to 0.79 mΩ.

26. The electrolytic capacitor as claimed in claim 25, wherein said void factor is not less than 10%.

27. The electrolytic capacitor as claimed in claim 26, wherein said capacitor element is formed by rolling a lamination structure of a separator sandwiched between said anode foil with an anode plug and said cathode foil with a cathode plug.

28. The electrolytic capacitor as claimed in claim 27, wherein said metal complex is an aluminum complex.

29. The electrolytic capacitor as claimed in claim 27, wherein a water content of said solvent is 35~100 wt %.

30. The electrolytic capacitor as claimed in claim 28, wherein a water content of said solvent is 35~100 wt %.

31. The electrolytic capacitor as claimed in claim 26, wherein said metal complex is an aluminum complex.

32. The electrolytic capacitor as claimed in claim 31, wherein a water content of said solvent is 35~100 wt %.

33. The electrolytic capacitor as claimed in claim 26, wherein a water content of said solvent is 35~100 wt %.

34. The electrolytic capacitor as claimed in claim 25, wherein a thickness of the cathode foil is 50~100 μm.

35. The electrolytic capacitor as claimed in claim 34, wherein said capacitor element is formed by rolling a lamination structure of a separator sandwiched between said anode foil with an anode plug and said cathode foil with a cathode plug.

36. The electrolytic capacitor as claimed in claim 35, wherein said metal complex is an aluminum complex.

37. The electrolytic capacitor as claimed in claim 35, wherein a water content of said solvent is 35~100 wt %.

38. The electrolytic capacitor as claimed in claim 36, wherein a water content of said solvent is 35~100 wt %.

39. The electrolytic capacitor as claimed in claim 34, wherein said metal complex is an aluminum complex.

40. The electrolytic capacitor as claimed in claim 39, wherein a water content of said solvent is 35~100 wt %.

41. The electrolytic capacitor as claimed in claim 34, wherein a water content of said solvent is 35~100 wt %.

42. The electrolytic capacitor as claimed in claim 25, wherein said capacitor element is formed by rolling a lamination structure of a separator sandwiched between said anode foil with an anode plug and said cathode foil with a cathode plug.

43. The electrolytic capacitor as claimed in claim 42, wherein said metal complex is an aluminum complex.

44. The electrolytic capacitor as claimed in claim 43, wherein a water content of said solvent is 35~100 wt %.

45. The electrolytic capacitor as claimed in claim 42, wherein a water content of said solvent is 35~100 wt %.

46. The electrolytic capacitor as claimed in claim 25, wherein said metal complex is an aluminum complex.

47. The electrolytic capacitor as claimed in claim 46, wherein a water content of said solvent is 35~100 wt %.

48. The electrolytic capacitor as claimed in claim 25, wherein a water content of said solvent is 35~100 wt %.

49. An anode foil for electrolytic capacitor, said anode foil comprising an etched foil of a void factor of not more than 51%, wherein a left-core thickness of the etched foil is from 35 to 65 μm and a foil resistivity of the etched foil is from 0.4 to 0.79 mΩ.

50. A cathode foil for electrolytic capacitor, said cathode foil comprising an etched foil of a void factor of not more than 44%, wherein a left-core thickness of the etched foil is from 35 to 65 μm and a foil resistivity of the etched foil is from 0.4 to 0.79 mΩ.

* * * * *